US012619440B2

(12) United States Patent　　　　　(10) Patent No.:　US 12,619,440 B2
Sun et al.　　　　　　　　　　　　　(45) Date of Patent:　　　　May 5, 2026

(54) STARTUP CONTROL METHOD, APPARATUS AND DEVICE FOR PCI DEVICES IN ARM SERVER

(71) Applicant: SUZHOU METABRAIN INTELLIGENT TECHNOLOGY CO., LTD., Suzhou (CN)

(72) Inventors: Xiuqiang Sun, Suzhou (CN); Jiaming Huang, Suzhou (CN); Peiyu Shi, Suzhou (CN); Xiaobao Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 206 days.

(21) Appl. No.: 18/571,202

(22) PCT Filed: Sep. 29, 2022

(86) PCT No.: PCT/CN2022/122738
§ 371 (c)(1),
(2) Date: Dec. 15, 2023

(87) PCT Pub. No.: WO2023/151287
PCT Pub. Date: Aug. 17, 2023

(65) Prior Publication Data
US 2024/0289133 A1　　Aug. 29, 2024

(30) Foreign Application Priority Data

Feb. 14, 2022　(CN) .......................... 202210131438.8

(51) Int. Cl.
G06F 3/00　　　　(2006.01)
G06F 9/4401　　(2018.01)
G06F 13/42　　　(2006.01)

(52) U.S. Cl.
CPC ........ G06F 9/4401 (2013.01); G06F 13/4221 (2013.01); *G06F 2213/0024* (2013.01)

(58) Field of Classification Search
CPC .............. G06F 9/4401; G06F 13/4221; G06F 2213/0024; G06F 9/4411; G06F 13/4295;
(Continued)

(56) References Cited

U.S. PATENT DOCUMENTS

2014/0115193 A1*　4/2014　Liu ....................... G06F 9/4411
710/8
2016/0116974 A1*　4/2016　Ginnela ................ H04M 19/04
713/2
(Continued)

FOREIGN PATENT DOCUMENTS

CN　　110134446 A　　8/2019
CN　　112732615 A　　4/2021
(Continued)

OTHER PUBLICATIONS

International Search Report and Written Opinion issued for International Patent Appl. No. PCT/CN2022/122738 mailed Dec. 2, 2022, 9 pgs.
(Continued)

*Primary Examiner* — Henry Tsai
*Assistant Examiner* — Kim T Huynh
(74) *Attorney, Agent, or Firm* — Merchant & Gould P.C.

(57)　　　　　　　ABSTRACT

This present disclosure discloses a startup control method, apparatus and device for PCI devices in an ARM server and a non-transitory computer-readable storage medium. During boot-up, segment numbers corresponding to PCI devices and PCI link bridge bus serial numbers corresponding to the PCI devices in PCI device drivers for the PCI devices connected to the ARM server are checked. The segment number corresponding to each of the PCI link bridge bus
(Continued)

serial numbers in an advanced configuration and power management interface protocol is configured according to the segment number and the PCI link bridge bus serial number corresponding to each of the PCI devices. System resources are allocated to the PCI devices according to the configured segment numbers.

19 Claims, 2 Drawing Sheets

(58) Field of Classification Search
CPC .............. G06F 9/45558; G06F 13/102; G06F 2009/45562
See application file for complete search history.

(56) References Cited

U.S. PATENT DOCUMENTS

2016/0188278 A1* 6/2016 Lee ........................ G09G 5/391
345/1.3

2018/0181440 A1* 6/2018 Chou .................. G06F 9/45558
2020/0012501 A1* 1/2020 Suryanarayana ....... G06F 21/52
2020/0278935 A1* 9/2020 Borikar .............. G06F 12/1027

FOREIGN PATENT DOCUMENTS

| CN | 113760667 A | 12/2021 |
|---|---|---|
| CN | 114185607 A | 3/2022 |

OTHER PUBLICATIONS

Chinese Search Report issued for Chinese Patent Appl. No. 2022101314388 dated Mar. 16, 2022, 2 pgs.
"!Pci," Microsoft Learn article, published on Oct. 26, 2023 accessed online via <https://docs.microsoft.com/en-us/windows-hardware/drivers/debugger/-pci>, 6 pgs.
Hober, Yao. "PCIe architecture," CSDN blog article published on Aug. 21, 2020 accessed online via <https://blog.csdn.net/yhb1047818384/article/details/106676548> , 15 pgs.

* cited by examiner

Fig. 1

Start

Check, during boot-up, segment numbers corresponding to PCI devices and PCI link bridge bus serial numbers corresponding to the PCI devices in PCI device drivers for the PCI devices connected to the ARM server — S101

Configure the segment number corresponding to each of the PCI link bridge bus serial numbers in an advanced configuration and power management interface protocol according to the segment number corresponding to each of the PCI devices and the PCI link bridge bus serial number corresponding to each of the PCI devices so as to allocate system resources to the PCI devices according to the configured segment numbers — S102

End

Fig. 2

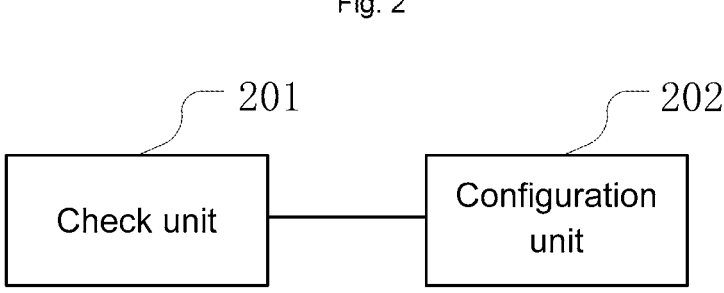

201 Check unit

202 Configuration unit

STARTUP CONTROL METHOD, APPARATUS AND DEVICE FOR PCI DEVICES IN ARM SERVER

CROSS-REFERENCE TO RELATED APPLICATIONS

This application is a National Stage Application of PCT/CN2022/122738, filed Sep. 29, 2022, which claims priority to Chinese Patent Application No. 202210131438.8, filed Feb. 14, 2022 in China, and which applications are incorporated herein by reference. To the extent appropriate, a claim of priority is made to each of the above-disclosed applications.

TECHNICAL FIELD

This present disclosure relates to the technical field of servers, and in particular to a startup control method, apparatus and device for Peripheral Component Interconnect (PCI) devices in an ARM server and a non-transitory computer-readable storage medium.

BACKGROUND

With continuous innovations and technical breakthroughs in the chip manufacturing process, a 5 nm manufacturing process has been used for advanced RISC machine (hereinafter referred to as ARM) servers, and the slogan that an ARM server itself focuses on low power consumption and high performance is increasingly accepted by more and more customers. Besides, the present disclosure of ARM servers is becoming more and more mature and breaking the monopoly of traditional servers to enter data centers of Internet customers. Thanks to the improvement of the manufacturing process, the number of cores of an ARM server has increased to 80. With the advantage of the number of cores of a single processor, ARMs have overtaken products from other chip manufacturers, and their performance has been qualitatively improved compared with products from other manufacturers. There are vast customer needs especially in the fields of public cloud, cloud games, cloud mobile phones, videos, artificial intelligence (hereinafter referred to as AI), etc. Based on the advantage that a single processor of an ARM has 80 cores, Internet customers have made great profits in deployment of the above services, and the cost performance of such servers has been greatly improved compared with servers based on other architectures, which increases benefits for more and more Internet customers.

However, as server products based on emerging architectures, ARM servers have a limited number of deployed present disclosures, and will encounter a variety of problems in the process of deploying present disclosures by various Internet customers. For example, for a NVIDIA TESLA T4 graphics card from NVIDIA (hereinafter referred to as T4 graphics card), failure to be supported by a virtualization container occurs in adaptation to a video service; but under servers based on other architectures, this problem never occurs.

As could be seen from the above problem occurring during the adaptation of the ARM server to the T4 graphics card, what must be solved in the process of applying ARM servers to satisfy the requirements of Internet services is an anomaly occurring in adaptation to a peripheral component interconnect (hereinafter referred to as PCI) device under a server based on an ARM architecture.

SUMMARY

An objective of this present disclosure is to provide a startup control method, apparatus and device for PCI devices in an ARM server and a non-transitory computer-readable storage medium The present disclosure provides a startup control method for PCI devices in an ARM server, including:

checking, during boot-up, segment numbers corresponding to the PCI devices and PCI link bridge bus serial numbers corresponding to the PCI devices in PCI device drivers for the PCI devices connected to the ARM server; and configuring the segment number corresponding to each of the PCI link bridge bus serial numbers in an advanced configuration and power management interface protocol according to the segment number corresponding to each of the PCI devices and the PCI link bridge bus serial number corresponding to each of the PCI devices, so as to allocate system resources to the PCI devices according to the configured segment numbers.

Optionally, configuring the segment number corresponding to each of the PCI link bridge bus serial numbers in the advanced configuration and power management interface protocol according to the segment number corresponding to each of the PCI devices and the PCI link bridge bus serial number corresponding to each of the PCI devices includes:

keeping the segment numbers in the advanced configuration and power management interface protocol unchanged when both the segment numbers and the PCI link bridge bus serial numbers corresponding to same PCI devices match a pre-established initial correspondence between each of the segment numbers and each of the PCI link bridge bus serial numbers in the advanced configuration and power management interface protocol; and updating the segment numbers corresponding to the PCI link bridge bus serial numbers in the advanced configuration and power management interface protocol in accordance with the segment numbers corresponding to the same PCI devices and the PCI link bridge bus serial numbers corresponding to the same PCI devices so as to satisfy consistency, when the segment numbers and the PCI link bridge bus serial numbers corresponding to the same PCI devices do not match the initial correspondence.

Optionally, allocating the system resources to the PCI devices according to the configured segment numbers includes:

enumerating each of the PCI devices and allocating the system resources to each of the PCI devices in an ascending order of the configured segment numbers in the advanced configuration and power management interface protocol.

Optionally, the startup control method further includes:

checking, through the PCI device drivers and PCI device check commands, whether the segment numbers corresponding to the PCI devices and the PCI link bridge bus serial numbers corresponding to the PCI devices are consistent with correspondence between the segment numbers and the PCI link bridge bus serial numbers configured in the advanced configuration and power management interface protocol after entering an operating system; and outputting a prompt that the PCI devices pass a display consistency check when the segment numbers corresponding to the PCI devices and the PCI link bridge bus serial numbers corresponding to the PCI devices are consistent with the correspondence.

Optionally, the startup control method further includes:

when the segment numbers corresponding to the PCI devices and the PCI link bridge bus serial numbers corresponding to the PCI devices are not consistent with the correspondence, returning to the operation of configuring the segment number corresponding to each of the PCI link bridge bus serial numbers in the advanced configuration and power management interface protocol according to the segment number corresponding to each of the PCI devices and the PCI link bridge bus serial number corresponding to each of the PCI devices so as to allocate the system resources to the PCI devices according to the configured segment numbers, or triggering a system restart.

Optionally, after outputting the prompt that the PCI devices pass the display consistency check, the startup control method further includes:

receiving a virtualization container creation command; and creating a virtualization container based on the PCI device driver corresponding to the virtualization container creation command.

Optionally, the PCI device includes a T4 graphics card, and the PCI device driver includes a T4 graphics card driver.

The present disclosure also provides a startup control apparatus for PCI devices in an ARM server, including:

a check unit, configured to check, during boot-up, segment numbers corresponding to PCI devices and PCI link bridge bus serial numbers corresponding to the PCI devices in PCI device drivers for the PCI devices connected to the ARM server; and a configuration unit, configured to configure the segment number corresponding to each of the PCI link bridge bus serial numbers in an advanced configuration and power management interface protocol according to the segment number corresponding to each of the PCI devices and the PCI link bridge bus serial number corresponding to each of the PCI devices so as to allocate system resources to the PCI devices according to the configured segment numbers.

The present disclosure also provides a startup control device for PCI devices in an ARM server, including:

a memory, configured to store a computer program; and a processor, configured to execute the computer program, the computer program implementing operations of the startup control method for PCI devices in an ARM server according to any of the foregoing when being executed by the processor.

The present disclosure also provides a non-transitory computer-readable storage medium, wherein a computer program is stored on the non-transitory computer-readable storage medium, and when executed by a processor, the computer program is configured to perform operations of the startup control method for PCI devices in an ARM server according to any of the foregoing Studies have found that an order of checking the T4 graphics cards by the T4 graphics card drivers under the system of the ARM server may be inconsistent with an actual link order of PCI links of the system, but the creation of the virtualization container needs to be carried out in accordance with an order displayed by the T4 graphics card drivers, which makes the T4 graphics card drivers fail to create the virtualization container, thus influencing the deployment of customer's services. Similar problems may also occur in scenarios where the ARM server is connected to other PCI devices. In view of this, according to the startup control method for PCI devices in an ARM server provided by this present disclosure, the segment numbers corresponding to the PCI devices and the PCI link bridge bus serial numbers corresponding to the PCI devices in the PCI device drivers for the PCI devices connected to the ARM server are checked during boot-up, and the segment number corresponding to each of the PCI link bridge bus serial numbers in an advanced configuration and power management interface protocol is configured according to the segment number corresponding to each of the PCI devices and the PCI link bridge bus serial number corresponding to each of the PCI devices so as to allocate the system resources to the PCI devices according to the configured segment numbers. This ensures that the order of checking the PCI devices in the PCI device drivers is consistent with an order of enumerating the PCI devices in a startup process, thus satisfying requirements of the PCI device drivers for implementing service functions.

This present disclosure also provides a startup control apparatus and device for PCI devices in an ARM server and a non-transitory computer-readable storage medium with the beneficial effects described above. Details will not be repeated here.

BRIEF DESCRIPTION OF THE DRAWINGS

In order to more clearly illustrate the embodiments of this present disclosure or the technical solutions in the prior art, the drawings used in the description of the embodiments or the prior art will be briefly described below. Obviously, the drawings in the following description are only some of the embodiments of this present disclosure, and those of ordinary skill in the art may obtain other drawings according to these drawings without any creative work.

FIG. 1 is a flowchart of a startup control method for PCI devices in an ARM server provided by an embodiment of this present disclosure;

FIG. 2 is a schematic structural diagram of a startup control apparatus for PCI devices in an ARM server provided by an embodiment of this present disclosure.

DETAILED DESCRIPTION OF THE EMBODIMENTS

Figure 3:
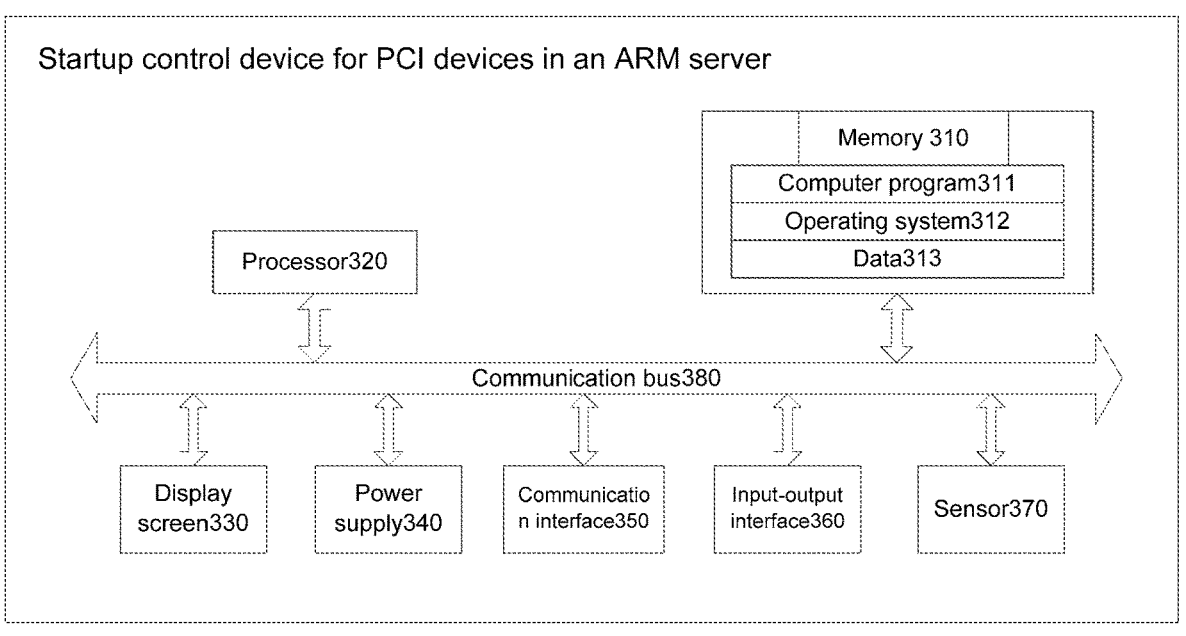
FIG. 3 is a schematic structural diagram of a startup control device for PCI devices in an ARM server provided by an embodiment of this present disclosure.

The core of this present disclosure is to provide a startup control method, apparatus and device for PCI devices in an ARM server and a non-transitory computer-readable storage medium for solving a problem that a service cannot be supported in adaptation to a PCI device under a server based on an ARM architecture.

The technical solutions in the embodiments of this present disclosure will be clearly and completely described below with reference to the drawings in the embodiments of this present disclosure. It is apparent that the described embodiments are only a part of the embodiments of this present disclosure, rather than all of the embodiments. All other embodiments obtained by those having ordinary skill in the art based on the embodiments in this present disclosure without creative work are within the protection scope of this present disclosure.

Embodiment 1

FIG. 1 is a flowchart of a startup control method for PCI devices in an ARM server provided by an embodiment of this present disclosure.

Studies have found that the ARM server differs from servers based on other architectures in that unique identification "Segment: bus: dev: fun" numbers (where "Segment" refers to a general term for occupied datafile space or a set of space used by database objects; and "bus: dev: fun" is short for "Bus, Device, Function", also known as BDF number) of PCI links of the former are established across segments, which is very different from traditional Intel servers. By default, enumeration and allocation of system resources are carried out in an ascending order of PCI link bridge bus serial numbers (referred to as RC numbers) in a startup process of the server. However, different segment numbers are allocated to different PCI links in the server based on the ARM architecture, so that an order of checking T4 graphics cards by T4 graphics card drivers under this system may be inconsistent with an actual link order of the PCI links of the system. As users may plug PCI devices into different physical slots of the ARM server at each boot-up of the device, this inconsistency will fluctuate. In contrast, the creation of a virtualization container needs to be carried out in accordance with an order displayed by the T4 graphics card drivers, which makes the T4 graphics card drivers fail to create the virtualization container, thus influencing the deployment of customer's services.

In view of this, according to the startup control method for PCI devices in an ARM server provided by this present disclosure, an order of enumerating the PCI devices in an Advanced Configuration and Power management Interface (ACPI) protocol in the ARM server is adjusted during boot-up to be consistent with the order displayed in the PCI device drivers, thus satisfying requirements of the PCI device drivers for implementing service functions.

As shown in FIG. 1, the startup control method for PCI devices in an ARM server provided by the embodiment of this present disclosure includes:

At S101: check, during boot-up, segment numbers corresponding to PCI devices and PCI link bridge bus serial numbers corresponding to the PCI devices in PCI device drivers for the PCI devices connected to the ARM server.

At S102: configure the segment number corresponding to each of the PCI link bridge bus serial numbers in an advanced configuration and power management interface protocol according to the segment number corresponding to each of the PCI devices and the PCI link bridge bus serial number corresponding to each of the PCI devices so as to allocate system resources to the PCI devices according to the configured segment numbers.

In a specific implementation, the startup control method for PCI devices in an ARM server provided by the embodiment of this present disclosure may be applied to a chip where a Basic Input Output System (BIOS) is located or other chips that may be run during boot-up and perform communication control on the BIOS.

Since it is found that the above problem that results in failure to create a virtualization container by a user prominently occurs in a T4 graphics card, the PCI device targeted by the startup control method for PCI devices in an ARM server provided by the embodiment of this present disclosure may be the T4 graphics card, and accordingly, the PCI device driver includes a T4 graphics card driver. Similarly, the PCI devices targeted by the startup control method for PCI devices in an ARM server provided by the embodiment of this present disclosure may also be ones of other types.

For operation S101, unique identifiers "Segment: bus: dev: fun" of the PCI devices in the PCI device drivers are checked during boot-up to determine the segment numbers corresponding to the PCI devices and the PCI link bridge bus serial numbers (i.e. RC numbers "bus") corresponding to the PCI devices. Each of the PCI device drivers is run as necessary to obtain the segment numbers corresponding to all the currently connected PCI devices and the PCI link bridge bus serial number corresponding to each of the PCI devices.

For operation S102, enumeration and allocation of the system resources are always carried out in an ascending order of the segment numbers in a traditional method for enumerating PCI devices. However, in order to make the order of enumerating the PCI devices conform to the order displayed in the PCI device drivers, it is necessary to adjust the segment numbers of the enumerated PCI devices based on the order displayed in the PCI device drivers, namely to configure the segment numbers corresponding to the PCI link bridge bus serial numbers in the advanced configuration and power management interface protocol in accordance with the segment numbers corresponding to the PCI devices and the PCI link bridge bus serial numbers corresponding to the PCI devices, so that the PCI devices may be enumerated and the system resource may be allocated to each of the PCI devices in the order displayed in the PCI device drivers when an advanced configuration and power management interface protocol program is run.

Usually, the allocating the system resources to the PCI devices according to the configured segment numbers in operation S102 includes: enumerating each of the PCI devices and allocating the system resources to each of the PCI devices in an ascending order of the configured segment numbers in the advanced configuration and power management interface protocol.

Embodiment 2

On the basis of the above embodiment, the initial correspondence between the segment numbers and the PCI link bridge bus serial numbers is usually recorded in the advanced configuration and power management interface protocol. For example, there are 12 segments in the ARM server. Each of two central processing units (hereinafter referred to as CPUs) corresponds to 6 segments. For example, a first CPU corresponds to the segment numbers 0 to 5, and a second CPU corresponds to the segment numbers 6 to 11. Such correspondence is used as a default relationship between the segment numbers and the PCI link bridge bus serial numbers is usually recorded in the advanced configuration and power management interface protocol, namely the initial correspondence. Under normal conditions, the inconsistency problem may be caused by different situations since the PCI devices have different positions connected to physical slots. In this case, only the segment number where the inconsistency problem occur in the advanced configuration and power management interface protocol needs to be adjusted on the basis of the initial correspondence.

In the startup control method for PCI devices in an ARM server provided by the embodiment of this present disclosure, configuring the segment number corresponding to each of the PCI link bridge bus serial numbers in an advanced configuration and power management interface protocol according to the segment number corresponding to each of the PCI devices and the PCI link bridge bus serial number corresponding to each of the PCI devices in operation S102 may include:

keeping the segment numbers in the advanced configuration and power management interface protocol unchanged when both the segment numbers and the PCI link bridge bus serial numbers corresponding to same PCI devices match a pre-established initial correspondence between each of the segment numbers and each of the PCI link bridge bus serial numbers in the advanced configuration and power management interface protocol; and updating the segment numbers corresponding to the PCI link bridge bus serial numbers in the advanced configuration and power management interface protocol in accordance with the segment numbers corresponding to the same PCI devices and the PCI link bridge bus serial numbers corresponding to the same PCI devices so as to satisfy consistency, when the segment numbers and the PCI link bridge bus serial numbers corresponding to the same PCI devices do not match the initial correspondence.

In a practical present disclosure, assuming that the first CPU corresponds to the segment numbers 0 to 5 and the second CPU corresponds to the segment numbers 6 to 11, then in the initial correspondence, the segment number 0 corresponds to the PCI link bridge bus serial number 0, the segment number 1 corresponds to the PCI link bridge bus serial number 1, and so on. When the PCI device drivers display, during boot-up, that the segment number and the PCI link bridge bus serial number corresponding to one PCI device are 1 and 0 respectively while the segment number and the PCI link bridge bus serial number corresponding to another PCI device are 0 and 1 respectively, then the initial correspondence between the PCI link bridge bus serial numbers and the segment numbers (RC 0-Segment 0, RC 1-Segment 1, . . . ) is changed into (RC 0-Segment 1, RC 1-Segment 0, . . . ) in the advanced configuration and power management interface protocol. After all the inconsistent segment numbers in the advanced configuration and power management interface protocol have been adjusted, the PCI devices are enumerated and the system resources are allocated thereto in an ascending order of the adjusted segment numbers.

Embodiment 3

On the basis of the above embodiment, in order to improve the control reliability of the PCI devices, the startup control method for PCI devices in an ARM server provided by the embodiment of this present disclosure may further include:

checking, through the PCI device drivers and PCI device check commands, whether the segment numbers corresponding to the PCI devices and the PCI link bridge bus serial numbers corresponding to the PCI devices are consistent with correspondence between the segment numbers and the PCI link bridge bus serial numbers configured in the advanced configuration and power management interface protocol after entering an operating system; and outputting a prompt that the PCI devices pass a display consistency check when the segment numbers corresponding to the PCI devices and the PCI link bridge bus serial numbers corresponding to the PCI devices are consistent with the segment numbers and the PCI link bridge bus serial numbers configured in the advanced configuration and power management interface protocol.

In a specific implementation, after entering the operating system stage, the segment numbers corresponding to the PCI devices and the PCI link bridge bus serial numbers corresponding to the PCI devices are checked through the PCI device driver, the correspondence between the segment numbers and the PCI link bridge bus serial numbers configured in the advanced configuration and power management interface protocol is checked through the PCI device check command, and these two correspondences are rechecked for consistency. When the segment numbers corresponding to the PCI devices and the PCI link bridge bus serial numbers corresponding to the PCI devices are consistent with the segment numbers and the PCI link bridge bus serial numbers configured in the advanced configuration and power management interface protocol, this means that the PCI device drivers may normally implement service functions. At this point, the prompt that the PCI devices pass the display consistency check is output to point out that the service functions may be invoked by the user.

Furthermore, after outputting the prompt that the PCI devices pass the display consistency check, the startup control method for PCI devices in an ARM server provided by the embodiment of this present disclosure may further include:

receiving a virtualization container creation command; and creating a virtualization container based on the PCI device driver corresponding to the virtualization container creation command.

In a practical present disclosure, for a PCI device bearing a virtual machine service, such as the T4 graphics card, a function of creating the virtualization container may be provided after a PCI device driver for the PCI device runs normally.

In addition, the startup control method for PCI devices in an ARM server provided by the embodiment of this present disclosure may further include:

when the segment numbers corresponding to the PCI devices and the PCI link bridge bus serial numbers corresponding to the PCI devices are not consistent with the correspondence, returning to the operation of configuring the segment number corresponding to each of the PCI link bridge bus serial numbers in the advanced configuration and power management interface protocol according to the segment number corresponding to each of the PCI devices and the PCI link bridge bus serial number corresponding to each of the PCI devices so as to allocate the system resources to the PCI devices according to the configured segment numbers, or triggering a system restart.

In a practical present disclosure, when it is checked, after entering the operating system stage, that the segment numbers corresponding to the PCI devices and the PCI link bridge bus serial numbers corresponding to the PCI devices are not consistent with the correspondence between the segment numbers and the PCI link bridge bus serial numbers configured in the advanced configuration and power management interface protocol, this means that the PCI device drivers cannot normally provide the service functions. At this point, operation S102 in the boot-up process may be returned to, thereby configuring the segment number corresponding to each of the PCI link bridge bus serial numbers in an advanced configuration and power management interface protocol again, and carrying out PCI enumeration and resource allocation; or the system restart is triggered, namely returning to operation S101 to execute the startup control of the PCI devices again.

Various embodiments corresponding to the startup control method for PCI devices in an ARM server have been described in detail above. Based on these, this present disclosure also discloses a startup control apparatus and device for PCI devices in an ARM server corresponding to the above method and a non-transitory computer-readable storage medium.

Embodiment 4

FIG. 2 is a schematic structural diagram of a startup control apparatus for PCI devices in an ARM server provided by an embodiment of this present disclosure.

As shown in FIG. 2, the startup control apparatus for PCI devices in an ARM server provided by the embodiment of this present disclosure includes:

a check unit 201, configured to check, during boot-up, segment numbers corresponding to PCI devices and PCI link bridge bus serial numbers corresponding to the PCI devices in PCI device drivers for the PCI devices connected to the ARM server; and a configuration unit 202, configured to configure the segment number corresponding to each of the PCI link bridge bus serial numbers in an advanced configuration and power management interface protocol according to the segment number corresponding to each of the PCI devices and the PCI link bridge bus serial number corresponding to each of the PCI devices, so as to allocate system resources to the PCI devices according to the configured segment numbers.

Furthermore, the startup control apparatus for PCI devices in an ARM server provided by the embodiment of this present disclosure may further include:

a check unit, configured to check, through the PCI device drivers and PCI device check commands, whether the segment numbers corresponding to the PCI devices and the PCI link bridge bus serial numbers corresponding to the PCI devices are consistent with correspondence between the segment numbers and the PCI link bridge bus serial numbers configured in the advanced configuration and power management interface protocol after entering an operating system; and an output unit, configured to output a prompt that the PCI devices pass a display consistency check when the segment numbers corresponding to the PCI devices and the PCI link bridge bus serial numbers corresponding to the PCI devices are consistent with the segment numbers and the PCI link bridge bus serial numbers configured in the advanced configuration and power management interface protocol.

Furthermore, the startup control apparatus for PCI devices in an ARM server provided by the embodiment of this present disclosure may further include:

a restart control unit, configured to, when the segment numbers corresponding to the PCI devices and the PCI link bridge bus serial numbers corresponding to the PCI devices are not consistent with the correspondence, return to the operation of configuring the segment number corresponding to each of the PCI link bridge bus serial numbers in the advanced configuration and power management interface protocol according to the segment number corresponding to each of the PCI devices and the PCI link bridge bus serial number corresponding to each of the PCI devices so as to allocate the system resources to the PCI devices according to the configured segment numbers, or trigger a system restart.

Furthermore, the startup control apparatus for PCI devices in an ARM server provided by the embodiment of this present disclosure may further include:

a receiving unit, configured to receive a virtualization container creation command after the outputting the prompt that the PCI devices pass the display consistency check; and a creation unit, configured to create a virtualization container based on the PCI device driver corresponding to the virtualization container creation command.

Since the embodiments of the apparatus part and the embodiments of the method part correspond to each other, reference could be made to the description of the embodiments of the method part for the embodiments of the apparatus part. Details will not be repeated here.

Embodiment 5

FIG. 3 is a schematic structural diagram of a startup control device for PCI devices in an ARM server provided by an embodiment of this present disclosure.

As shown in FIG. 3, the startup control device for PCI devices in an ARM server provided by the embodiment of this present disclosure includes:

a memory 310, configured to store a computer program 311; and a processor 320, configured to execute the computer program 311, the computer program 311 implementing operations of the startup control method for PCI devices in an ARM server according to any of the above embodiments when being executed by the processor 320.

The processor 320 may include one or more processing cores, such as a 3-core processor, 8-core processor etc. The processor 320 may be implemented in at least one hardware form of a Digital Signal Processing (DSP), a Field-Programmable Gate Array (FPGA) and a programmable logic array (PLA). The processor 320 may further include a main processor and a co-processor. The main processor is a processor configured to process data in an awake state, also known as a Central Processing Unit (CPU); and the co-processor is a processor having low power consumption, configured to process data in a standby state. In some embodiments, the processor 320 may be integrated with a Graphics Processing Unit (GPU). The GPU is configured to be responsible for the rendering and drawing of a content to be displayed by a display screen. In some embodiments, the processor 320 may further include an Artificial Intelligence (AI) processor. The AI processor is configured to process calculating operations related to machine learning.

The memory 310 may include one or more non-transitory computer-readable storage media. The non-transitory computer-readable storage media may be non-transient. The memory 310 may further include high-speed random access memories and non-transitory memories, for example one or more disk storage devices and flash storage devices. In this embodiment, the memory 310 is at least configured to store the following computer program 311. The computer program 311 may implement related operations in the startup control method for PCI devices in an ARM server disclosed by any of the above embodiments after being loaded and executed by the processor 320. In addition, resources stored by the memory 310 may further include an operating system 312, data 313 etc. The storage may be carried out transiently or permanently. The operating system 312 may be Windows. The data 313 may include, but not limited to data related to the above method.

In some embodiments, the startup control device for PCI devices in an ARM server may further include a display screen 330, a power supply 340, a communication interface 350, an input-output interface 360, a sensor 370 and a communication bus 380.

It may be understood by those skilled in the art that the structure shown in FIG. 3 does not constitute a limitation to the startup control device for PCI devices in an ARM server and may include more or fewer components than those shown in the drawing.

The startup control device for PCI devices in an ARM server provided by the embodiment of this present disclosure includes the memory and the processor, and the processor may implement, when executing the program stored in the memory, the startup control method for PCI devices in an ARM server according to the above embodiment so as to achieve the same effect as the foregoing.

It should be noted that the apparatus and device embodiments described above are only schematic. For example, the division of modules is only a division of logical functions. In an practical implementation, there may be other division manners, for example, a plurality of modules or components may be combined or may be integrated into another system, or some features may be omitted or not performed. In addition, the displayed or discussed mutual coupling or direct coupling or communication connection may be indirect coupling or communication connection through some interfaces, apparatuses or modules, and may be in electrical, mechanical or other forms. The modules described as separate components may or may not be physically separated, and the components displayed as modules may or may not be physical modules, that is, they may be located in one place, or may be distributed onto a plurality of network modules. Part or all of the modules may be selected according to actual needs to achieve the purposes of the solution of this embodiment.

In addition, the functional modules in each embodiment of this present disclosure may be integrated into one processing module, or each module may exist alone physically, or two or more modules may be integrated into one module. The above integrated module may be implemented in the form of hardware or implemented in the form of a software function module.

When the integrated module is implemented in the form of a software function module and sold or used as an independent product, the integrated module may be stored in a non-transitory computer-readable storage medium. Based on such an understanding, the technical solution of this present disclosure essentially, or the part making a contribution to the prior art or all or part of the technical solution may be embodied in the form of a software product, and the software product is stored in a storage medium to execute all or part of the operations of the methods in the embodiments of this present disclosure.

In view of this, an embodiment of this present disclosure also provides a non-transitory computer-readable storage medium. The non-transitory computer-readable storage medium has a computer program stored thereon. The computer program implements operations of the startup control method for PCI devices in an ARM server when being executed by a processor.

The non-transitory computer-readable storage medium may include a U disk, a mobile hard disk, a Read-Only Memory (ROM), a Random Access Memory (RAM), a magnetic disc, an optical disk or various media capable of storing program codes.

The computer program included in the non-transitory computer-readable storage medium provided in this embodiment may implement, when being executed by the processor, the startup control method for PCI devices in an ARM server according to the above embodiment so as to achieve the same effect as the foregoing.

The startup control method, apparatus and device for PCI devices in an ARM server and the non-transitory computer-readable storage medium provided by this present disclosure have been described in detail above. The various embodiments in the specification are described in a progressive manner, each embodiment focuses on differences from other embodiments, and the same/similar parts between the various embodiments may be mutually referenced. For the apparatus, the device and the non-transitory computer-readable storage medium disclosed in the embodiments, since they correspond to the method disclosed in the embodiment, the description of them is relatively simple, and reference could be made to the description of the method part for their relevant contents. It should be noted that those of ordinary skill in the art may make several improvements and modifications to this present disclosure without departing from the principles of this present disclosure, and such improvements and modifications also fall into the protection scope of the claims of this present disclosure.

It should be further noted that the relational terms such as "first" and "second" in this specification are only used to distinguish one entity or operation from another entity or operation, and do not necessarily require or imply any such actual relationship or order between these entities or operations. Besides, the terms "including", "comprising" or any other variants thereof are intended to cover non-exclusive inclusion, so that a process, method, article or device including a series of elements includes not only those elements, but also other elements that are not expressly listed or elements that are inherent to such process, method, article or device. In the absence of further limitations, an element defined by the phrase "including a . . . " does not exclude the presence of additional identical elements in the process, method, article or device including the element.

What is claimed is:

1. A startup control method for Peripheral Component Interconnect (PCI) devices in an Advanced RISC Machine (ARM) server, comprising:

checking, during boot-up, segment numbers corresponding to PCI devices and PCI link bridge bus serial numbers corresponding to the PCI devices in PCI device drivers for the PCI devices connected to the ARM server; and configuring the segment number corresponding to each of the PCI link bridge bus serial numbers in an advanced configuration and power management interface protocol according to the segment number corresponding to each of the PCI devices and the PCI link bridge bus serial number corresponding to each of the PCI devices, so as to allocate system resources to the PCI devices according to the configured segment numbers;

wherein allocating the system resources to the PCI devices according to the configured segment numbers comprises: enumerating each of the PCI devices and allocating the system resources to each of the PCI devices in an ascending order of the configured segment numbers in the advanced configuration and power management interface protocol.

2. The startup control method according to claim 1, wherein configuring the segment number corresponding to each of the PCI link bridge bus serial numbers in the advanced configuration and power management interface protocol according to the segment number corresponding to each of the PCI devices and the PCI link bridge bus serial number corresponding to each of the PCI devices comprises:

keeping the segment numbers in the advanced configuration and power management interface protocol unchanged, when both the segment numbers and the PCI link bridge bus serial numbers corresponding to same PCI devices match a pre-established initial correspondence between each of the segment numbers and each of the PCI link bridge bus serial numbers in the advanced configuration and power management interface protocol; and updating the segment numbers corresponding to the PCI link bridge bus serial numbers in the advanced configuration and power management interface protocol in accordance with the segment numbers corresponding to the same PCI devices and the PCI link bridge bus serial numbers corresponding to the same PCI devices so as to satisfy consistency, when the segment numbers and the PCI link bridge bus serial numbers corresponding to the same PCI devices do not match the initial correspondence.

3. The startup control method according to claim 1, wherein the startup control method further comprises:

checking, through the PCI device drivers and PCI device check commands, whether the segment numbers corresponding to the PCI devices and the PCI link bridge bus serial numbers corresponding to the PCI devices are consistent with correspondence between the segment numbers and the PCI link bridge bus serial numbers configured in the advanced configuration and power management interface protocol after entering an operating system; and outputting a prompt that the PCI devices pass a display consistency check, when the segment numbers corresponding to the PCI devices and the PCI link bridge bus serial numbers corresponding to the PCI devices are consistent with the correspondence.

4. The startup control method according to claim 3, wherein the startup control method further comprises:

when the segment numbers corresponding to the PCI devices and the PCI link bridge bus serial numbers corresponding to the PCI devices are not consistent with the correspondence, returning to the operation of configuring the segment number corresponding to each of the PCI link bridge bus serial numbers in the advanced configuration and power management interface protocol according to the segment number corresponding to each of the PCI devices and the PCI link bridge bus serial number corresponding to each of the PCI devices, so as to allocate the system resources to the PCI devices according to the configured segment numbers, or triggering a system restart.

5. The startup control method according to claim 3, wherein after outputting the prompt that the PCI devices pass the display consistency check, the startup control method further comprises:

receiving a virtualization container creation command; and creating a virtualization container based on the PCI device driver corresponding to the virtualization container creation command.

6. The startup control method according to claim 1, wherein the PCI device comprises a T4 graphics card, and the PCI device driver comprises a T4 graphics card driver.

7. The startup control method according to claim 1, wherein the startup control method is applied to a chip where a basic input output system (BIOS) is located.

8. The startup control method according to claim 1, wherein the startup control method is applied to a chip that is run during boot-up and performs communication control on a basic input output system (BIOS).

9. A startup control device for PCI devices in an ARM server, comprising:

a memory, configured to store a computer program; and a processor, configured to execute the computer program, and when the computer program is executed by the processor, the computer program is configured to perform the following operations:

check, during boot-up, segment numbers corresponding to PCI devices and PCI link bridge bus serial numbers corresponding to the PCI devices in PCI device drivers for the PCI devices connected to an ARM server; and configure the segment number corresponding to each of the PCI link bridge bus serial numbers in an advanced configuration and power management interface protocol according to the segment number corresponding to each of the PCI devices and the PCI link bridge bus serial number corresponding to each of the PCI devices, so as to allocate system resources to the PCI devices according to the configured segment numbers;

wherein the system resources to the PCI devices is allocated according to the following operations:

enumerate each of the PCI devices and allocate the system resources to each of the PCI devices in an ascending order of the configured segment numbers in the advanced configuration and power management interface protocol.

10. The startup control device according to claim 9, wherein the processor comprises a main processor and a co-processor, wherein the main processor is configured to process data in an awake state; and the co-processor is configured to process data in a standby state.

11. The startup control device according to claim 9, wherein the startup control device comprises a display screen, a power supply, a communication interface, an input-output interface, a sensor and a communication bus.

12. The startup control device according to claim 11, wherein the memory, the processor, the display screen, the power supply, the communication interface, the input-output interface and the sensor are all connected with the communication bus.

13. A non-transitory computer-readable storage medium, wherein a computer program is stored on the non-transitory computer-readable storage medium, and when executed by a processor, the computer program is configured to perform the following operations:

check, during boot-up, segment numbers corresponding to PCI devices and PCI link bridge bus serial numbers corresponding to the PCI devices in PCI device drivers for the PCI devices connected to an ARM server; and configure the segment number corresponding to each of the PCI link bridge bus serial numbers in an advanced configuration and power management interface protocol according to the segment number corresponding to each of the PCI devices and the PCI link bridge bus serial number corresponding to each of the PCI devices, so as to allocate system resources to the PCI devices according to the configured segment numbers;

wherein the system resources to the PCI devices is allocated according to the following operations:

enumerate each of the PCI devices and allocate the system resources to each of the PCI devices in an ascending order of the configured segment numbers in the advanced configuration and power management interface protocol.

14. The startup control device for PCI devices in an ARM server according to claim 9, wherein configuring the segment number corresponding to each of the PCI link bridge bus serial numbers in the advanced configuration and power management interface protocol according to the segment number corresponding to each of the PCI devices and the PCI link bridge bus serial number corresponding to each of the PCI devices comprises:

keeping the segment numbers in the advanced configuration and power management interface protocol unchanged, when both the segment numbers and the PCI link bridge bus serial numbers corresponding to same PCI devices match a pre-established initial correspondence between each of the segment numbers and each of the PCI link bridge bus serial numbers in the advanced configuration and power management interface protocol; and updating the segment numbers corresponding to the PCI link bridge bus serial numbers in the advanced configuration and power management interface protocol in accordance with the segment numbers corresponding to the same PCI devices and the PCI link bridge bus serial numbers corresponding to the same PCI devices so as to satisfy consistency, when the segment numbers and the PCI link bridge bus serial numbers corresponding to the same PCI devices do not match the initial correspondence.

15. The startup control device for PCI devices in an ARM server according to claim 9, wherein allocating the system resources to the PCI devices according to the configured segment numbers comprises:

enumerating each of the PCI devices and allocating the system resources to each of the PCI devices in an ascending order of the configured segment numbers in the advanced configuration and power management interface protocol.

16. The startup control device for PCI devices in an ARM server according to claim 9, wherein the processor is used for further implementing following operations when executing the computer program:

checking, through the PCI device drivers and PCI device check commands, whether the segment numbers corresponding to the PCI devices and the PCI link bridge bus serial numbers corresponding to the PCI devices are consistent with correspondence between the segment numbers and the PCI link bridge bus serial numbers configured in the advanced configuration and power management interface protocol after entering an operating system; and outputting a prompt that the PCI devices pass a display consistency check, when the segment numbers corresponding to the PCI devices and the PCI link bridge bus serial numbers corresponding to the PCI devices are consistent with the correspondence.

17. The startup control device for PCI devices in an ARM server according to claim 16, wherein the processor is used for further implementing following operations when executing the computer program:

when the segment numbers corresponding to the PCI devices and the PCI link bridge bus serial numbers corresponding to the PCI devices are not consistent with the correspondence, returning to the operation of configuring the segment number corresponding to each of the PCI link bridge bus serial numbers in the advanced configuration and power management interface protocol according to the segment number corresponding to each of the PCI devices and the PCI link bridge bus serial number corresponding to each of the PCI devices, so as to allocate the system resources to the PCI devices according to the configured segment numbers, or triggering a system restart.

18. The startup control device for PCI devices in an ARM server according to claim 16, wherein after outputting the prompt that the PCI devices pass the display consistency check, the processor is used for further implementing following operations when executing the computer program:

receiving a virtualization container creation command; and creating a virtualization container based on the PCI device driver corresponding to the virtualization container creation command.

19. The startup control device for PCI devices in an ARM server according to claim 9, wherein the PCI device comprises a T4 graphics card, and the PCI device driver comprises a T4 graphics card driver.

* * * * *